United States Patent
Bremer et al.

(10) Patent No.: US 12,023,696 B2
(45) Date of Patent: Jul. 2, 2024

(54) NOZZLE FAULT DETECTION

(71) Applicant: Intelligent Agricultural Solutions LLC, Fargo, ND (US)

(72) Inventors: Marshall T. Bremer, Fargo, ND (US); Bradley Schleusner, Fargo, ND (US); Daniel R. Wood, Jr., Fargo, ND (US)

(73) Assignee: Intelligent Agricultural Solutions LLC, Fargo, ND (US)

( * ) Notice: Subject to any disclaimer, the term of this patent is extended or adjusted under 35 U.S.C. 154(b) by 319 days.

(21) Appl. No.: 17/613,735

(22) PCT Filed: May 29, 2020

(86) PCT No.: PCT/US2020/035150
§ 371 (c)(1),
(2) Date: Nov. 23, 2021

(87) PCT Pub. No.: WO2020/243450
PCT Pub. Date: Dec. 3, 2020

(65) Prior Publication Data
US 2022/0234064 A1 Jul. 28, 2022

Related U.S. Application Data

(60) Provisional application No. 62/855,214, filed on May 31, 2019.

(51) Int. Cl.
*B05B 12/00* (2018.01)
*A01C 23/00* (2006.01)
(Continued)

(52) U.S. Cl.
CPC .......... *B05B 12/008* (2013.01); *A01C 23/007* (2013.01); *A01M 7/005* (2013.01);
(Continued)

(58) Field of Classification Search
CPC ... B05B 12/008; B05B 1/3046; B05B 1/3073; G01D 5/145
See application file for complete search history.

(56) References Cited

U.S. PATENT DOCUMENTS 4,709,857 A 12/1987 Wilger
5,128,688 A 7/1992 West
(Continued)

FOREIGN PATENT DOCUMENTS

EP 3162448 A1 5/2017

OTHER PUBLICATIONS

International Search Report and Written Opinion for PCT Application No. PCT/US2020/035150, Dated Sep. 11, 2020, pp. 13.

(Continued)

*Primary Examiner* — Erika J. Villaluna

(57) ABSTRACT

A spray system includes nozzles spaced along a distribution line. Each nozzle actuates the position of one or more internal valves based on a spray command received from a system control module. Sensors generate position information regarding the actuation of the valves. The actual valve positions are compared to expected valve positions to determine a deviation between the two. The deviation can be compared to a threshold to determine a status of that nozzle. A normal nozzle status can be generated based on the deviation being less than the threshold. An abnormal nozzle status can be generated based on the deviation being equal to or exceeding the threshold.

19 Claims, 5 Drawing Sheets

(51) Int. Cl.
  *A01M 7/00*     (2006.01)
  *B05B 12/08*    (2006.01)
  *B05B 15/658*   (2018.01)
  *G01D 5/14*     (2006.01)
  *G01L 19/00*    (2006.01)
  *B05B 1/30*     (2006.01)

(52) U.S. Cl.
  CPC ........... *A01M 7/0089* (2013.01); *B05B 12/08* (2013.01); *B05B 15/658* (2018.02); *G01D 5/145* (2013.01); *G01L 19/0092* (2013.01); *B05B 1/3046* (2013.01); *B05B 1/3073* (2013.01)

(56) References Cited

U.S. PATENT DOCUMENTS

| | | |
|---|---|---|
| 5,326,036 A | 7/1994 | Wilger |
| 6,053,427 A | 4/2000 | Wilger et al. |
| 6,126,088 A | 10/2000 | Wilger et al. |
| 10,219,506 B2 | 3/2019 | Ni |
| 10,462,985 B2 | 11/2019 | Wilger |
| 2014/0263709 A1 | 9/2014 | Kocer et al. |
| 2015/0115058 A1 | 4/2015 | Wilger |
| 2017/0036228 A1 | 2/2017 | Thurow et al. |
| 2017/0348718 A1 | 12/2017 | Preheim et al. |
| 2019/0029170 A1 | 1/2019 | Wilger |
| 2019/0166775 A1 | 6/2019 | Wilger |
| 2019/0339103 A1 | 11/2019 | Wilger et al. |

OTHER PUBLICATIONS

Wilger, "Wilger Electronic Flow Monitoring System," pp. 4.
International Preliminary Report on Patentability for PCT Application No. PCT/US2020/035150, Dated Dec. 9, 2021, pp. 9.

NOZZLE FAULT DETECTION

CROSS-REFERENCE TO RELATED APPLICATION(S)

This application claims the benefit of U.S. Provisional Application No. 62/855,214 filed May 31, 2019 for "NOZZLE FAULT DETECTION" by M. T. Bremer and B. Schleusner.

BACKGROUND

This disclosure relates generally to spray systems. More particularly, this disclosure relates to nozzle fault detection within a spray system.

Agricultural sprayers apply material to a field by emitting multiple individual sprays of fluid. Nozzles generate each of those individual sprays and are spaced along the width of a boom. The material can be applied to the field according to a prescription map, which is a map that specifies application rates throughout the field. The application rates can vary depending on the field conditions. In some cases, the nozzles and/or groups of nozzles can be individually controlled such that application rates can vary across the width of the boom.

During operation, the spray emitted from the nozzle can become non-uniform. A non-uniform spray can cause undesired spraying in the field. Thus, the material may be over-applied or under-applied. For example, sediment or another obstruction may block the nozzle orifice. The components of the nozzle can wear during operation.

SUMMARY

A method of detecting faults in spray nozzles includes actuating a first valve based on a spray command; generating, by a first position sensor, first position information regarding an actual position of the first valve; comparing, by a controller, the actual position of the first valve to an expected position of the first valve, wherein the expected position is determined from baseline position information; generating, by the controller, a nozzle status based on the comparison of the actual position and the expected position.

A nozzle fault detection system includes a plurality of nozzles disposed along a boom extending from an agricultural sprayer and a control module communicatively connected to the plurality of nozzles. A first one of the plurality of nozzles includes a first valve at least partially disposed within a first nozzle body and configured to control liquid flow and/or downstream pressure through a first flowpath in the first nozzle body; a first position sensor operatively coupled to the first valve, the first position sensor configured to generate first position information; a first liquid sensor configured to sense a liquid parameter of the liquid flowing through the first flow path; and a nozzle controller communicatively coupled to the first valve and configured to control actuation of the first valve. The first position information is an actual position of the first valve. The control module includes control circuitry; and a memory encoded with instructions that, when executed by the control circuitry, cause the control module to generate a first spray command and send the first spray command to the first nozzle; compare the actual position of the first valve to an expected position of the first valve, the expected position based on baseline position information; and determine a nozzle status of the first nozzle based on the comparison of the actual position and the expected position.

DETAILED DESCRIPTION

Figure 1:
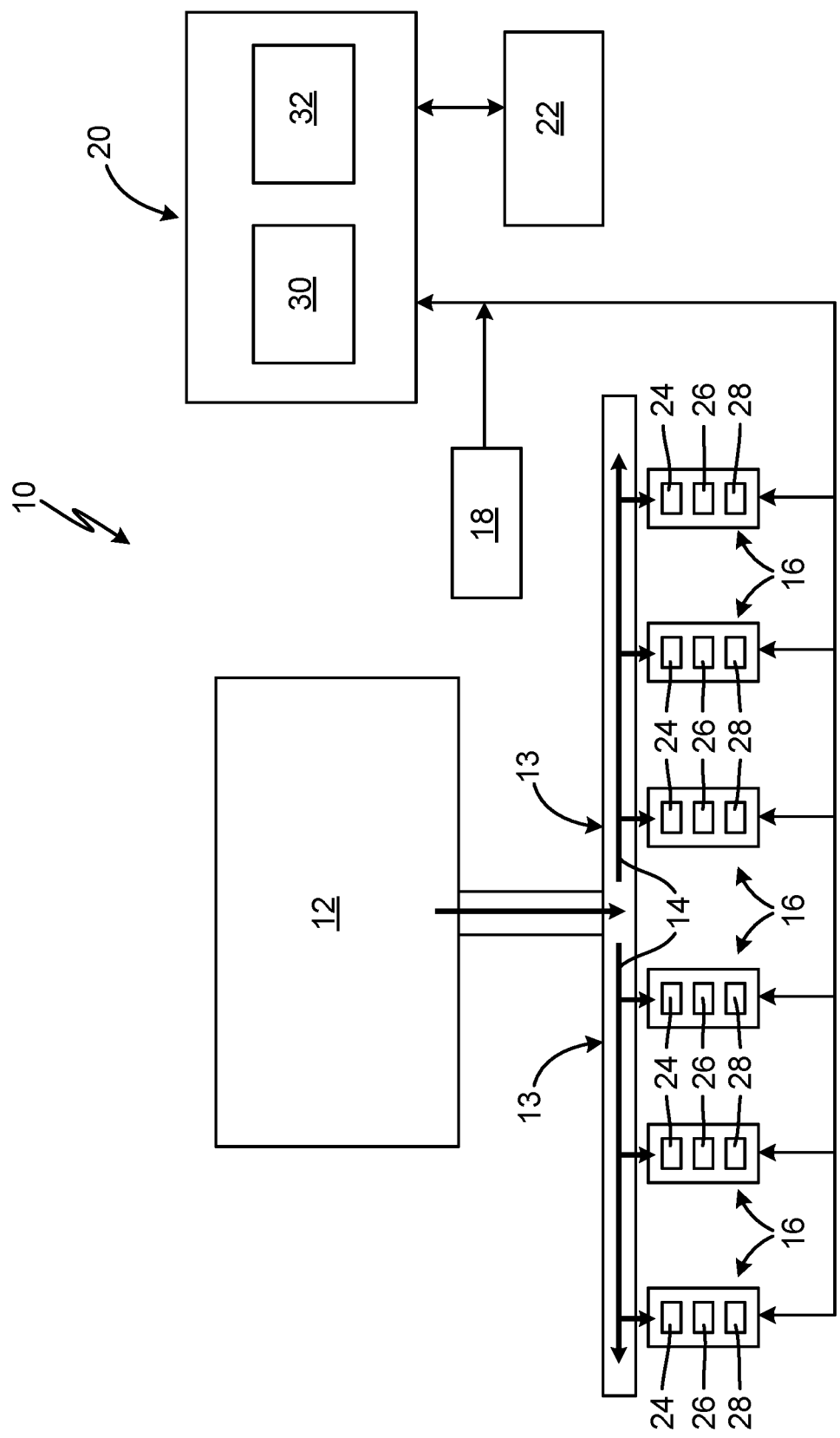
FIG. 1 is a schematic block diagram of a spray system.

FIG. 1 is a schematic block diagram of spray system 10. Spray system 10 includes supply tank 12, boom 13, distribution lines 14, nozzles 16, system sensors 18, control module 20, and user interface 22. Each nozzle 16 includes nozzle sensor(s) 24, valve(s) 26, and nozzle controller 28. Control module 20 includes control circuitry 30 and memory 32.

Spray system 10 is configured to apply liquid sprays onto a target surface via nozzles 16. For example, spray system 10 can be configured as part of an agricultural spraying system configured to apply liquid sprays to fields. Spray system 10 can be configured to apply herbicides, pesticides, fungicides, and liquid fertilizers, among other options. In some examples, spray system 10 can be integrated into a self-propelled agricultural sprayer. In other examples, spray system 10 can be attached to and towed by another agricultural implement. While spray system 10 is described as implemented in an agricultural sprayer, it is understood that spray system 10 can be operated according to the techniques described herein in multiple environments and across a variety of applications. System sensors 18 are configured to generate data regarding spray system 10 during operation. For example, system sensors 18 can be configured to generate any one or more of geo-positioning data, ground speed data, and wheel deflection data, among other types of data.

Spray system 10 includes a vehicle configured to traverse a surface that the spray is applied to. The vehicle supports various other components of spray system 10. Supply tank 12 stores a supply of liquid for spraying. Booms 13 extend laterally from the vehicle. Distribution lines 14 are fluidly connected to supply tank 12 to receive liquid from supply tank 12. Nozzles 16 are mounted on distribution lines 14 to receive the liquid from distribution lines 14 and to expel the liquid as a spray.

Supply tank 12 can be mounted to a frame and/or supported by a surface. In the example shown, supply tank 12 is mounted on a vehicle. For example, the vehicle can be an agricultural spraying implement and supply tank 12 can be mounted to the frame of the agricultural spraying implement. In another example, the vehicle can be a truck or other similar vehicle and supply tank can be supported by the bed of the truck or other vehicle. Supply tank 12 is configured to provide the liquid to distribution lines 14. Spray system 10 can include a motive device of any desired configuration for driving the liquid through distribution lines 14. For example, supply tank 12 can be pressurized and/or a pump can be disposed to pump the liquid from supply tank 12 through distribution lines 14 to nozzles 16.

Distribution lines 14 can be of any configuration suitable for conveying the liquid from supply tank 12 to nozzles 16. Distribution lines 14 can be tubular supply manifolds that project from an agricultural spraying implement. Distribution lines 14 can be supported by booms 13 that project laterally from the implement relative to a direction of travel of the implement. In some examples, multiple nozzles 16 can be connected to a common distribution line 14 such that the distribution line 14 feeds each of the multiple nozzles 16.

In other examples, distribution lines 14 can include multiple individual flow tubes extending to nozzles 16. In one example, spray system 10 can include the same number of flow tubes as nozzles 16. Nozzles 16 are configured to eject the liquid as a liquid spray.

Control module 20 is configured to generate and provide spray commands to nozzles 16 to cause nozzles 16 to emit liquid sprays according to a desired application rate and droplet size. In some examples, control module 20 generates individual spray commands and provides an individual spray command to each nozzle 16. In some examples, control module 20 provides individual spray commands to groups of nozzles 16.

The application rate is a product of both the flow rate of the liquid in nozzle 16 and the speed of nozzle 16 relative to the surface being sprayed (i.e., the relative ground speed of nozzle 16). It is understood that the desired droplet size can include a spray consisting of a skewed distribution of multiple droplet sizes that are characterized by a representative diameter (e.g., a volume median diameter (DV0.5)) or in relation to droplet size categories (e.g., as defined by American Society of Agricultural and Biological Engineers (ASABE) S-572.1). As such, the desired droplet size can be understood as a representative diameter and/or based on a standardized category.

The spray command can instruct nozzle 16 to emit a liquid spray having a first application rate and a first droplet size. The spray command can be based on any desired input parameter. For example, a prescription map for a field can be stored in memory 32 of control module 20, and control module 20 can generate the spray commands based on the prescription map. Control module 20 can be configured to generate the spray commands based on geo-positioning data. For example, system sensors 18 can include a geo-positioning receiver communicatively linked to control module 20. Control module 20 can be configured to generate commands based on based on location data from GPS (Global Positioning System), GNSS (Global Navigation Satellite System), GPS/RTK (GPS/Real Time Kinematic), or equivalent systems.

Control module 20 can be of any suitable configuration for controlling operation of components of spray system 10, gathering data, processing data, etc. For example, control module 20 can generate spray commands, send the spray commands to nozzles 16, receive data from nozzles 16, and determine the status of each nozzle 16. As such, control module 20 can be of any type suitable for operating in accordance with the techniques described herein. In some examples, control module 20 can be implemented as a plurality of discrete circuitry subassemblies. In some examples, control module 20 can be integrated with the control system for the agricultural implement. In other examples, control module 20 can be separate from and in communication with the control system of the agricultural implement.

Control circuitry 30 is configured to implement functionality and/or process instructions. Control circuitry 30 can include one or more processors, configured to implement functionality and/or process instructions. For example, control circuitry 30 can be capable of processing instructions stored in memory 32. Examples of control circuitry 30 can include any one or more of a microprocessor, a controller, a digital signal processor (DSP), an application specific integrated circuit (ASIC), a field-programmable gate array (FPGA), or other equivalent discrete or integrated logic circuitry.

In some examples, control circuitry 30 can include communications circuitry configured to facilitate wired or wireless communications. For example, the communications circuitry can facilitate radio frequency communications and/or can facilitate communications over a network, such as a local area network, wide area network, and/or the Internet.

Memory 32, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 32 is a temporary memory, meaning that a primary purpose of memory 32 is not long-term storage. Memory 32, in some examples, is described as volatile memory, meaning that memory 32 does not maintain stored contents when power to spray system 10 is turned off. Examples of volatile memories can include random access memories (RAM), dynamic random access memories (DRAM), static random access memories (SRAM), and other forms of volatile memories. In some examples, memory 32 is used to store program instructions for execution by control circuitry 30. For example, memory 32 can store instructions that, when executed by control circuitry 30, cause control module 20 to generate a nozzle status, as discussed in more detail below. For example, the nozzle status can be based on spray commands, spray data generated by nozzle 16, and/or baseline data, among other options. The nozzle status can be stored in memory 32, transmitted to the user via user interface 22, and/or transferred to a remote computing device. Memory 32, in one example, is used by software or applications running on control circuitry 30 to temporarily store information during program execution.

Memory 32, in some examples, also includes one or more computer-readable storage media. Memory 32 can be configured to store larger amounts of information than volatile memory. Memory 32 can further be configured for long-term storage of information. In some examples, memory 32 includes non-volatile storage elements. For example, spray system 10 can include non-volatile storage elements such as flash memories or forms of electrically programmable memories (EPROM) or electrically erasable and programmable (EEPROM) memories. In some examples, memory 32 can be external and can be received in a memory card slot of spray system 10. For example, memory 32 can be an external hard drive, flash drive, memory card, secure digital (SD) card, micro SD card, or other such device.

User interface 22 can be any graphical and/or mechanical interface that enables user interaction with control module 20. For example, user interface 22 can implement a graphical user interface displayed at a display device of user interface 22 for presenting information to and/or receiving input from a user. User interface 22 can include graphical navigation and control elements, such as graphical buttons or other graphical control elements presented at the display device. User interface 22, in some examples, includes physical navigation and control elements, such as physically-actuated buttons or other physical navigation and control elements. In general, user interface 22 can include any input and/or output devices and control elements that can enable user interaction with control module 20. In some examples, user interface 22 can be integrated into a cab of an agricultural spraying implement.

Nozzles 16 generate liquid sprays for application on the target surface, such as application in a field. Each nozzle 16 can be individually controlled by control module 20 to apply the liquid spray according to a desired application rate and having a desired droplet size.

Valve 26 is disposed in nozzle 16 and controls the flow of liquid through nozzle 16. Valve 26 is actively controlled during operation. Valve 26 is capable of being actuated to a variety of open positions, with each of the open positions corresponding to a different flow path size through nozzle 16. The positioning of valve 26 controls the liquid flow rate in nozzle 16 and the liquid pressure in nozzle 16. In some examples, valve 26 is configured to control the dimensions of a flowpath through the body of nozzle 16. In other examples, valve 26 is configured to control the configuration of the orifice through which the liquid is ejected as a spray. Valve 26 can be actuated to any desired position to generate the liquid spray having the desired flow rate and droplet size. In one example, a first valve 26 controls the dimensions of a flowpath through the body of nozzle 16 and a second valve 26 controls the dimensions of a spray orifice of nozzle 16. In examples where nozzle 16 includes multiple valves 26, it is understood that the valves 26 can all be of the same configuration or can be of differing configurations. In examples where nozzle 16 includes multiple valves 26, the valves 26 can be individually controlled to generate a spray having the desired flow rate and droplet size.

Sensor 24 is configured to generate spray data regarding nozzle 16. The spray data can include one or more of valve position information and liquid parameter information. The valve position information includes information related to the positioning of components of valve 26. For example, valve 26 can be actuated by a stepper motor and the valve position information can be a step count. In other examples, sensor 24 can be a transducer, such as a linear transducer, configured to sense displacement of the valve member of valve 26.

The liquid parameter information includes information relating to the liquid flowing through nozzle 16. For example, the liquid parameter information can include the volumetric flow of the liquid and/or the pressure of the liquid flowing through nozzle 16, among other options. As such, sensor 24 can include a flow sensor configured to sense a liquid flow rate, can include a pressure sensor configured to sense a liquid pressure, and/or can be of any other type suitable for generating the liquid parameter information. In some examples, nozzle 16 can include multiple sensors 24 of different types. For example, nozzle 16 can include sensors 24 configured to generate valve position information and sensors 24 configured to generate liquid parameter information. Sensor 24 is configured to provide the spray data to control module 20 and/or nozzle controller 28.

In some examples, sensors 24 can also include spray fan sensors. For example, a sensor 24 can be configured to sense the presence of the spray fan and characteristics of the spray fan, such as the droplet size. The spray fan sensor 24 can generate and provide spray fan information to one or both of nozzle controller 28 and control module 20.

Nozzle controller 28 is integrated into nozzle 16. Nozzle controller 28 is configured to actuate valves 26 in response to spray commands from control module 20 and based on the state of spray system 10. Nozzle controller 28 is configured to cause valve 26 to actuate to a position configured to generate a spray having the desired application rate and droplet size. The application rate is based on both the liquid flow rate and the speed of nozzle 16 relative to the surface. In some examples, nozzle controller 28 can determine the relative ground speed of nozzle 16 based on the location of nozzle 16 on distribution line 14 and on the ground speed of spray system 10. For example, system sensors 18 can include ground speed sensors, such as speed sensors incorporating geo-positioning receivers. In one example, the ground speed sensors can be disposed at opposite ends of distribution lines 14. Nozzle controller 28 can determine the relative speed of its nozzle 16 based on the location of its nozzle 16 along distribution line 14 and the ground speed each end of distribution line 14. It is understood, however, that system sensors 18 can include any type of sensor suitable for generating the ground speed data. Nozzle controller 28 can be configured to determine the relative ground speed of nozzle 16 according to any suitable technique.

Nozzle controller 28 adjusts the positioning of valve 26 based the liquid parameter information from sensor 24 to ensure that nozzle 16 is emitting liquid according to the spray command Nozzle controller 28 can be of any type suitable for controlling actuation of valve 26 based on commands from control module 20 and/or on spray data from sensor 24. Nozzle controller 28 can include control circuitry and memory. For example, nozzle controller 28 can include a microprocessor, a controller, a digital signal processor (DSP), an application specific integrated circuit (ASIC), a field-programmable gate array (FPGA), or other equivalent discrete or integrated logic circuitry.

Control module 20 generates spray commands and transmits the spray commands to nozzles 16 to cause nozzles 16 to emit liquid sprays according to the commanded application rate and droplet size. For example, control module 20 can generate a spray command calling for a first application rate and a first droplet size. The spray command is received by nozzle controller 28. Nozzle controller 28 actuates valve 26 to a spray position associated with the first application rate and first droplet size based on the spray command. The actuation of valve 26 is sensed by sensor 24. Sensor 24 generates valve position information based on actuation of valve. The valve position information provides the actual position to which valve 26 is actuated to generate the spray based on the spray command Sensor 24 can transmit that valve positional information to control module 20 and/or nozzle controller 28.

Control module 20 is configured to generate a nozzle status based on the actual valve position received from each nozzle 16. Control module 20 determines a deviation between the actual valve position and an expected valve position. The valve position can be normalized to facilitate the comparison. For example, a value of zero can be applied when valve is fully closed and a value of one can be applied when the valve is fully open. Control module 20 generates the nozzle status based on the deviation. While control module 20 is described as generating a nozzle status based on the valve position, it is understood that in some examples, control module 20 can determine a nozzle status based on a deviation between actual droplet size and expected droplet size. For example, the actual droplet size can be calculated based on the actual liquid pressure and the actual flow rate and/or can be sensed by a spray fan sensor 24. The actual droplet size can be compared to the expected droplet size, and a deviation therebetween can be utilized to determine the nozzle status.

In some examples, nozzle controller 28 and/or control module 20 can be configured to generate and provide an alert to the user based on the information from the spray fan sensor 24 indicating a change in the droplet size. For example, the spray fan information from the spray fan sensor 24 can indicate that the median diameter of the droplets in the spray fan has changed by a threshold value. In other examples, the spray fan information can indicate that the sensed droplet size has changed categories (e.g., variations between droplet size categories as defined by the ASABE S-572.1 standard, such as extremely fine, fine, medium, coarse, ultra coarse, etc.)

The expected valve position is the position that valve 26 is expected to be in given the commanded application rate and droplet size. The expected valve position is derived from baseline valve data. The baseline valve data can be of any form suitable for providing a reference against which the valve positional information is compared to determine a status of nozzle 16. For example, the baseline valve data can be historical valve data based on the actuation history of that particular nozzle 16, reference valve data obtained from one or more similarly-situated nozzles 16 within spray system 10, and/or modeled valve data obtained from a model. The baseline data can also be referred to as baseline position information. In some examples, the baseline valve data can be generated prior to operation and stored in memory 32. In other examples, the baseline valve data can be generated during operation and stored in memory 32. Nozzle controller 28 can also be configured to determine its own nozzle status based on a comparison of the valve position information and historical valve data stored in the memory of nozzle controller 28. While the baseline valve data is described with regard to control module 20, it is understood that nozzle controller 28 can be configured to generate and utilize the baseline valve data in accordance with the techniques described herein.

Historical valve data for each nozzle 16 can be generated and stored by one or both of control module 20 and nozzle controller 28. The historical valve data can be generated and/or updated during operation of spray system 10. The historical data can include, among other options, an aggregation of valve positional information and/or spray data previously generated by nozzle 16. For example, valve 26 is actuated to a first position based on a first spray command providing a first application rate and a first droplet size. The valve position information generated by actuation of valve 26 can be transmitted to control module 20 and stored in memory 32. The valve position information can also be stored in the memory of nozzle controller 28. As additional spray data is generated, the additional spray data can be aggregated by control module 20 to generate the historical valve data for each nozzle 16. Control module 20 derives the expected position of valve 26 based on the historical valve data. For example, control module 20 can average the historical valve data to obtain an average valve position based on previous actuations of valve 26. Control module 20 can utilize the average valve position as the expected valve position.

In some cases, control module 20 can be configured to generate a nozzle status based on trends in the historical valve data. For example, plotting each data point forming the historical valve data can indicate a positional drift as the components of nozzle 16 wear during operation. Control module 20 can be configured to generate the nozzle status based on the magnitude of the drift. Control module 20 can also be configured to generate the nozzle status based on variations in the drift. For example, small variations in the position of valve 26 can be expected based on the historical valve data and the known magnitude of the drift. A large variation can indicate a failure and/or clog and control module 20 can generate the abnormal nozzle status based on the sudden large variation. The historical valve data can be reset based on valve maintenance occurring. In other examples, the historical valve data can be stored in memory 32 for system tracking. For example, the current historical trend can be compared to previous historical trends to determine data points that indicate nozzle 16 is approaching a failure. The nozzle status can be generated based on the comparison of historical trends and based on the actual valve position being within a range approaching the previous failure point. For example, the previous historical trend can indicate that a nozzle 16 failed after a first number of cycles. Control module 20 can generate a nozzle status indicating the expected remaining life based on the first number of cycles and the actual number of cycles of the current nozzle 16.

Reference valve data can be generated and stored by control module 20. The reference valve data is based on spray data generated by nozzles 16 similarly-situated to the nozzle 16 being analyzed. The similarly-situated nozzles 16 can be referred to as reference nozzles. For example, assume a first nozzle 16 is the nozzle currently being analyzed. Control module 20 generates and provides a first spray command to each of the first nozzle 16, a second nozzle 16, and a third nozzle 16. The first nozzle 16 generates first spray data. The second spray data received from the second nozzle 16 and the third spray data third nozzle 16 can be utilized as and/or utilized to generate the reference valve data. Control module 20 can determine an expected valve position based on the second spray data and/or the third spray data. In some examples, control module 20 can average the positional information from the reference nozzles 16 to generate the reference valve data. Control module 20 generates the nozzle status based on a comparison of the actual position from the first nozzle 16 and the expected position derived from the spray data received from the second nozzle and third nozzle. In one example, the reference nozzles 16 are disposed on distribution line 15 adjacent to the first nozzle 16. It is understood, however, that the reference nozzles can be located at any position along distribution lines 14. It is also understood that the reference valve data can be based on as many or as few reference nozzles 16 as desired.

Modeled valve data can also be utilized as the baseline valve data for generating the nozzle status. A model of spray system 10 can be utilized to generate expected positions for nozzles 16 based on various spray commands. The modeled valve data can be generated in any suitable manner. In some examples, the model is run prior to operation of spray system 10 and the modeled valve data is stored in memory 32. In other examples, the model can be run in real time on control module 20 or another computing device. The data derived from the real time model can be utilized as the modeled valve data. The information generated by the model can be stored in memory 32 of control module 20 and/or in the memory of each nozzle controller 28. Control module 20 can compare the actual valve position to the expected valve position derived from the model to generate the nozzle status.

The nozzle status provides an indication of the current state of nozzle 16. The nozzle status is configured to indicate whether nozzle 16 is operating normally or abnormally. An abnormal nozzle status can include one or more severity levels. For example, a first severity level can indicate that preventative maintenance should be performed, while a second severity level can indicate that maintenance must be performed as nozzle 16. For example, the second severity level can indicate that a component of nozzle 16 has failed. In addition to component wear and failure, the abnormal nozzle status can also indicate the presence of clogs and/or other obstructions to the spray. As such, the nozzle status can, in some examples, indicate that no action is required, indicate that maintenance is recommended, or indicate that maintenance is required. The nozzle status can be provided to the user via user interface 22.

Control module 20 is configured to determine the nozzle status based on the difference between the actual valve data and the baseline valve data. Control module 20 compares the difference to a threshold to determine the nozzle status. For example, the normal nozzle status can be generated based on the difference being less than a threshold. The abnormal nozzle status can be generated based on the difference being greater than or equal to the threshold. In some examples, an abnormal nozzle status of a first severity level can be generated based on the difference being greater than or equal to a first threshold but less than a second threshold. An abnormal nozzle status of a second severity level can be generated based on the difference being greater than or equal to the second threshold.

The thresholds can be based on a deviation level between the actual position information and the expected position information. For example, the threshold can be based on the magnitude of the deviation between the actual position and the expected position of valve 26. In one example, a first threshold can be based on the actual position varying from the expected position by 1.5 standard deviations and a second threshold can be based on the actual position varying from the expected position by 3 standard deviations. While the nozzle status is described as based on standard deviations, it is understood that any technique suitable for determining a deviation magnitude between the actual valve position and the expected valve position can be utilized. For example, the threshold can be a percentage difference or a fractional value. While the nozzle status is described as being based on one or two thresholds, it is understood that nozzle statuses can be generated based on as few or as many thresholds as desired.

In other examples, the thresholds be based both on the difference between the actual position and the expected position and on a temporal factor. For example, the abnormal nozzle status can be based on the actual position varying from the expected position for a set time period. While the thresholds are describe as based on the deviation between the actual valve position and the expected valve position and/or on an additional temporal factor, it is understood that the threshold can be based on any combination of factors suitable for determining the operating status of nozzle 16.

During operation, spray system 10 generates liquid sprays and applies the liquid sprays to a target surface. In one example, spray system 10 is an agricultural spray system that is traversed over a field and applies sprays of agricultural liquid to the field. Control module 20 generates spray commands and transmits the spray commands to nozzles 16. In some examples, control module 20 generates individual spray commands and transmits the individual spray commands to individual nozzles 16. The spray commands cause the nozzles 16 to emit liquid sprays according to a desired application rate and at a desired droplet size. For example, control module 20 can generate the spray commands based on a prescription map for the field that spray system 10 is traversing. The prescription map can be stored in memory 32.

For each nozzle 16, nozzle controller 28 actuates valve 26 based on the spray command to achieve the desired application rate and droplet size. Sensor 24 generates spray data, including valve position information based on the position of valve 26. The spray data is provided to nozzle controller 28 and/or control module 20.

Control module 20 can recall baseline valve data from memory 32 and can determine an expected valve position from the baseline valve data. Control module 20 compares the actual valve position to the expected valve position to generate a nozzle status for each nozzle 16. As discussed above, the baseline valve data can be any one or more of historical valve data, reference valve data, and modeled valve data, among other options.

Control module 20 can take various actions based on the determined nozzle status. In examples where the nozzle status is a normal nozzle status, control module 20 can record the normal status of nozzle 16 and store that normal status in memory 32. In some examples, control module 20 is configured to take no additional action based on the nozzle status being a normal nozzle status.

In some examples, control module 20 can be configured to generate a spray report regarding the spray operation. The spray report can indicate the status of each nozzle 16 in spray system 10 during operation. In some examples, the spray report can indicate the locations in the field where the status of any nozzle 16 changed from one of a normal nozzle status and an abnormal nozzle status to the other of the normal nozzle status and the abnormal nozzle status. The spray report can also indicate those locations in the field over which any nozzle 16 having an abnormal nozzle status traversed. The spray report can further indicate the actions taken, if any, regarding the abnormal nozzle status. In some examples, the spray report can indicate which nozzle 16 experienced an abnormal status, when the abnormal status occurred, the duration of the abnormal status, and any actions taken in response to the abnormal status, among other information. Control module 20 can also be configured to record the location, time, duration, etc. of an abnormal nozzle status. That information can be stored in memory 32 and incorporated into the spray report.

Control module 20 can, in some examples, be configured to initiate an auto-correct routine based on the abnormal nozzle status. For example, control module 20 can command valve 26 to cycle fully open and fully closed to attempt to dislodge sediment that could be clogging nozzle 16. If the nozzle status does not return to a normal nozzle status after the auto-correct routine, then the abnormal nozzle status is likely based component wear and/or failure instead of a clog or obstruction. In some examples, control module 20 can cause any nozzle 16 having an abnormal nozzle status to stop spraying.

In some examples, control module 20 provides an alarm to the user, such as via user interface 22, based on control module 20 determining an abnormal nozzle status. For example, control module 20 can generate a prompt and provide the prompt to the user based on the abnormal nozzle status. The prompt can ask the user to take an action in response to the abnormal nozzle status. For example, the prompt can ask if the user wants control module 20 to initiate an auto-correct routine to attempt to correct the abnormal nozzle status, such as by cycling valve 26 open and closed.

Control module 20 can be further configured to generate and provide different alarms based on the severity level of the abnormal nozzle status. For example, control module 20 can generate and provide a first alarm to the user based on the abnormal nozzle status being of a first severity level. The abnormal nozzle status of the first severity level can indicate to the user that maintenance should be performed on nozzle. Control module 20 can generate and provide a second alarm to the user based on the abnormal nozzle status being of a second severity level. The abnormal status of the second severity level can indicate to the user that a failure has occurred and maintenance and/or repair is required.

Spray system 10 provides significant advantages. Spray system 10 tracks and generates nozzle statuses regarding each one of the multiple nozzles 16 in spray system 10. Valves 26 are positioned such that nozzle 16 emits a liquid spray according to a desired application rate and having a desired droplet size. The positioning of valves 26 controls the application rate and droplet size. Control module 20 receives spray data from each nozzle and can compare that spray data to baseline data to determine if nozzle 16 has properly actuated based on the spray command. The actual valve data varying from the baseline valve data can indicate that a component of nozzle 16 requires maintenance and/or that a component of nozzle 16 has failed. For example, a sudden variation in the actual valve data can indicate the presence of a blockage in nozzle 16, such as a blockage due to sediment. A sudden variation can also indicate that a component of nozzle 16 has failed, such as a seal in valve 26. The actual valve data can also drift over time as various components in nozzle 16 experience wear. The drift can be monitored and control module 20 can generate alarms based on the drift. Control module 20 can also provide statuses of varying severity levels, thereby indicating to the user whether maintenance should be performed or must be performed. Providing the different severity levels allows the user to more efficiently allocate resources within spray system 10. Tracking the statuses of individual nozzles 16 allows the user to repair nozzles 16 before failures occur, thereby increasing spray efficiency. In addition, tracking each individual nozzle 16 provides direct feedback of the operation of each nozzle 16, allowing the user to pinpoint the location of a failure. Tracking the nozzle statuses in real-time can also prevent over-application and under-application of the liquid, as the user is alerted to failures as the failures occur. In addition, the spray reports can provide the user with the actual application rates and droplet sizes applied by spray system 10. Such information allows the user to better plan future spray applications and allows the user to tailor prescription maps.

Figure 2:
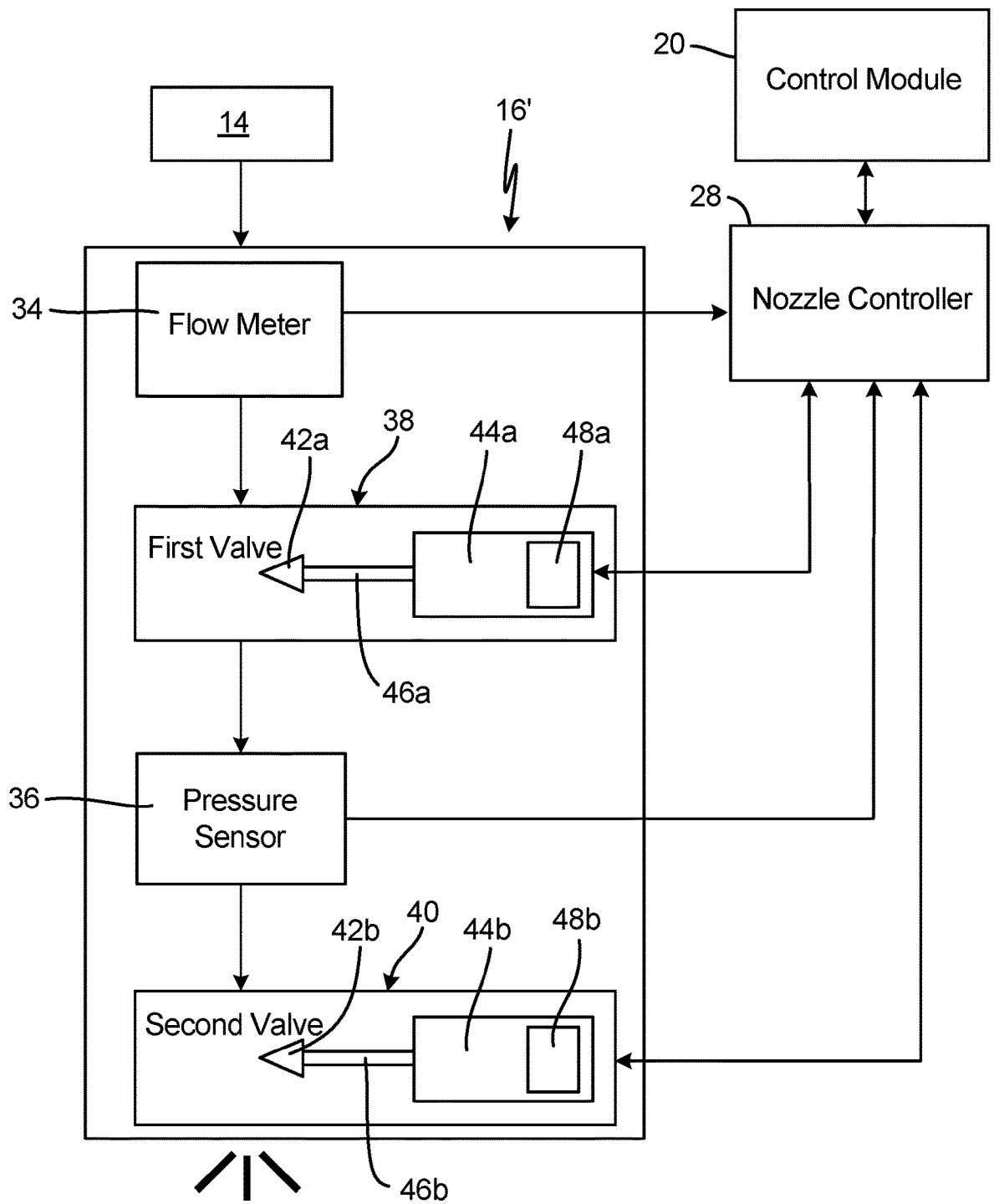
FIG. 2 is a schematic block diagram of a spray system and a nozzle.

FIG. 2 is a block schematic diagram of nozzle 16'. Distribution line 14 and control module 20 of spray system 10 (FIG. 1) are shown. Nozzle 16' includes nozzle controller 28, flow meter 34, pressure sensor 36, first valve 38, and second valve 40. Valve 26a includes valve member 42a, actuator 44a, arm 46a, and position sensor 48a. Valve 26b includes valve member 42b, actuator 44b, arm 46b, and position sensor 48b.

Nozzle 16' is substantially similar to nozzle 16 (FIG. 1) and can be operated according to the techniques described herein. Nozzle 16' is mounted to distribution line 14 to receive liquid from distribution line 14. Nozzle 16' is configured to eject a liquid spray at a particular application rate and droplet size. The liquid enters nozzle 16' from distribution line 14 and flows through flow meter 34. Flow meter 34 is a flow meter configured to generate volumetric flow data or mass flow data, which can be converted to volumetric flow utilizing an assumed density, regarding the liquid flow. Flow meter 34 can be of any configuration suitable for sensing the flow rate of the liquid and can be of any type suitable for generating the volumetric flow data. For example, flow meter 34 can be a cyclonic flow meter, thermal mass flow meter, ultrasonic flow meter, electromagnetic flow meter, acoustic material flow meter, impeller flow meter, axial turbine flow meter, or paddlewheel flow meter, among other options. The volumetric flow data can be provided to nozzle controller 28 and/or to control module 20. While flow meter 34 is shown as disposed upstream of first valve 38, it is understood that flow meter 34 can be disposed at any desired location upstream of the orifice through which the liquid exits nozzle 16'.

The liquid flows downstream from flow meter 34 through first valve 38. First valve 38 is an actively controlled valve configured to create a restrictive orifice in the flowpath extending through nozzle 16'. First valve 38 thereby controls a flow rate of the liquid in nozzle 16'. Valve member 42a is disposed in the flowpath through nozzle 16'. The position of valve member 42a can be actively controlled throughout operation to control the size of the flowpath through first valve 38. Valve member 42a can be of any type suitable for controlling flow through nozzle 16'. For example, valve member 42a can be a needle, among other options.

Actuator 44a is connected to valve member 42a and is configured to actuate valve member 42a between various positions. Actuator 44a can be of any type suitable for actuating flow control valve between a closed state and one or more open positions. For example, actuator 44a can be an electric motor, a pneumatic motor, or a hydraulic motor, among other options. In one example, actuator 44a is a stepper motor.

Arm 46a extends from actuator 44a to valve member 42a. Arm 46a is driven by actuator 44a and drives movement of valve member 42a to alter the size of the flowpath through first valve 38. Arm 46a can be of any suitable configuration for driving valve member 42a. In one example, arm 46a is configured to be linearly driven by actuator 44a. For example, arm 46a can be a piston or a shaft, among other options. In another example, arm 46a is configured to be rotatably driven by actuator 44a. For example, arm 46a can be a screw, among other options.

Position sensor 48a is configured to generate valve position information regarding the position of valve member 42a. In some examples, position sensor 48a is configured to sense displacement of arm 46a, which correlates to movement of valve member 42a and thus to the position of valve member 42a. In examples where arm 46a is linearly driven, position sensor 48a can be a linear transducer configured to sense displacement of piston. In examples where arm 46a is rotatably driven, position sensor 48a can be configured to sense rotation of arm 46a. For example, position sensor 48a can be a Hall-effect sensor or an encoder. In examples where actuator 44a is a stepper motor, position sensor 48a can be configured to count steps. It is understood, however, that position sensor 48a can be of any type suitable for generating valve position information. Position sensor 48a provides the valve position information to one or both of nozzle controller 28 and control module 20.

Pressure sensor 36 is configured to generate pressure data regarding the liquid flow in nozzle 16'. As such, pressure sensor 36 can be a pressure sensor. Pressure sensor 36 can be of any configuration suitable for sensing the pressure of the liquid and generating the pressure data. The pressure data can be transmitted to one or both of nozzle controller 28 and control module 20.

Second valve 40 is disposed downstream of pressure sensor 36. Second valve 40 is an actively controlled valve configured to create a restrictive orifice at the flowpath exit from nozzle 16'. As such, second valve 40 is an orifice valve that controls the configuration of the spray orifice of nozzle 16'. Valve member 42b is disposed at the downstream end of the flowpath and is configured to control the orifice size. For example, valve member 42b can be an impingement member, as discussed in more detail below. It is understood, however, that valve member 42b can be of any type suitable for controlling the orifice of nozzle 16'.

Actuator 44b is connected to valve member 42b and is configured to actuate valve member 42b between various positions. Actuator 44b can be of any type suitable for actuating second valve 40 between a closed state and the open positions. For example, actuator 44b can be an electric motor, a pneumatic motor, or a hydraulic motor. In one example, actuator 44b is a stepper motor.

Arm 46b extends from actuator 44b to valve member 42b. Arm 46b is driven by actuator 44b and drives movement of valve member 42b to alter the size of the orifice. Arm 46b can be of any suitable configuration for driving valve member 42b. In one example, arm 46b is configured to be linearly driven by actuator 44b. For example, arm 46b can be a piston or a shaft, among other options. In another example, arm 46b is configured to be rotatably driven by actuator 44b. For example, arm 46b can be a screw, among other options.

Position sensor 48b is configured to generate valve position information regarding the position of valve member 42b. In some examples, position sensor 48b is configured to sense displacement of arm 46b, which correlates to movement of valve member 42b and thus to the position of valve member 42b. In examples where arm 46b is linearly driven, pressure sensor 36 can be a linear transducer configured to sense displacement of piston. In examples where arm 46b is rotatably driven, position sensor 48b can be configured to sense rotation of arm 46b. For example, position sensor 48b can be a Hall-effect sensor or an encoder. In examples where actuator 44b is a stepper motor, position sensor 48b can be configured to count steps. It is understood, however, that position sensor 48a can be of any type suitable for generating valve position information. Position sensor 48b provides the valve position information to one or both of nozzle controller 28 and control module 20.

Nozzle controller 28 is configured to receive spray commands from control module 20 and to generate position commands based on the spray command Nozzle controller 28 provides the position commands to actuators 44a, 44b. Actuators 44a, 44b actuates each valve member 42a, 42b to the position commanded by the position commands to obtain the desired application rate and droplet size. The positions of valve members 42a, 42b control the flow rate through nozzle 16' and the pressure in nozzle 16'. The liquid pressure and position of valve member 42b control the droplet size of the spray emitted by nozzle 16'. Nozzle controller 28 receives liquid parameter information from flow meter 34 and pressure sensor 36. Nozzle controller 28 is configured to adjust the positions of valve members 42a, 42b based on the liquid parameter information to ensure that the liquid spray is emitted according to the spray command.

Valve position information for first valve 38 and second valve 40 is generated by position sensors 48a, 48b, respectively. The valve position information is provided to nozzle controller 28 and/or control module 20. In some examples, nozzle controller 28 is configured to perform a comparison of the positional data and baseline data to generate a nozzle status. Nozzle controller 28 can be configured to provide the nozzle status to control module 20 and/or directly to the user, such as via user interface 22 (FIG. 1). In some examples, nozzle controller 28 can be configured to provide the nozzle status to control module 20 only when the nozzle status data indicates an abnormal nozzle status. In other examples, the valve position information is communicated to control module 20 and control module 20 determines the nozzle status based on the valve position information.

Spray system 10 provides significant advantages. Each of first valve 38 and second valve 40 can be individually controlled to generate a liquid spray having the desired characteristics. Valve position information is generated during operation and the valve position information is utilized to determine the nozzle status of nozzle 16'. Generating a nozzle status for an individual nozzle 16' provides discrete maintenance information to the user. This allows the user to better allocate material, time, and monetary resources. In addition, nozzle 16' provides the user greater confidence that the liquid spray emitted by nozzle 16' is in accord with the spray command.

Figure 3:
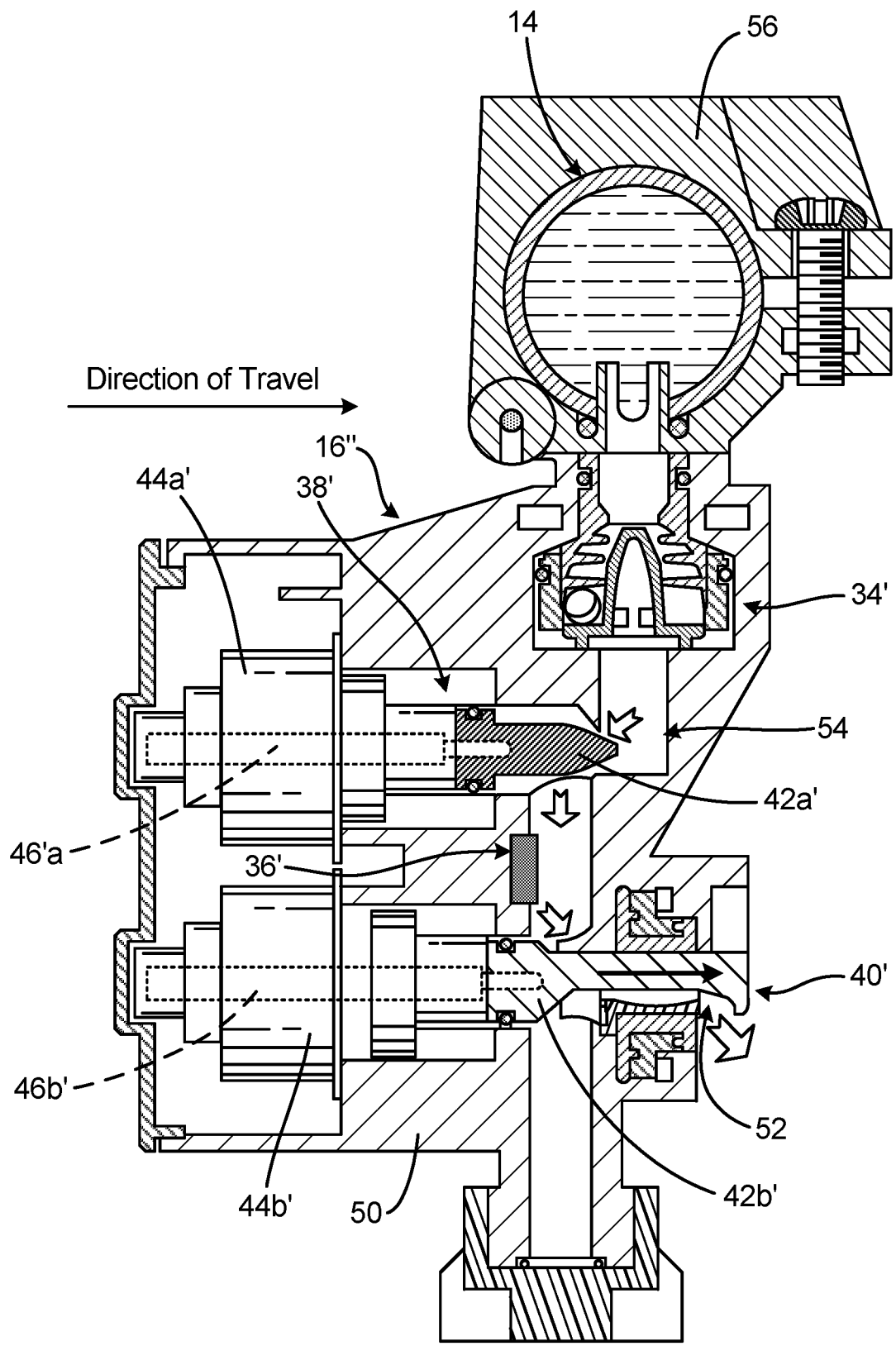
FIG. 3 is a cross-sectional view of a nozzle.

FIG. 3 is a cross-sectional view of nozzle 16". Distribution line 14 of spray system 10 is shown. Nozzle 16" includes flow meter 34', pressure sensor 36', flow control valve 38', orifice valve 40', nozzle body 50, orifice 52, flowpath 54, and mount 56. Flow control valve 38' includes valve member 42a', actuator 44a', and arm 46a'. Orifice valve 40' includes valve member 42b', actuator 44b', and arm 46b'.

Nozzle 16" is substantially similar to nozzle 16 (FIG. 1) and nozzle 16' (FIG. 2). It is understood that nozzle 16" can be operated in accordance with the techniques described herein. Nozzle 16" is mounted to distribution line 14. Mount 56 is attached to nozzle body 50 and is configured to clamp onto distribution line 14. Flowpath 54 extends through nozzle body 50 to orifice 52. Orifice 52 generates the liquid spray as the liquid exits flowpath 54.

Flow meter 34' is disposed in nozzle body 50 and is configured to generate volumetric flow data regarding the liquid flowing into nozzle 16". In the example shown, flow meter 34' is a cyclonic flow meter having a ball that is rotatably driven by the liquid flowing through the body of flow meter 34'. A sensor senses rotation of the ball about an axis of flow meter 34' and can generate the volumetric flow data based on that rotation. It is understood, however, that flow meter 34' can be of any type suitable for sensing the flow of liquid through flowpath and for generating the volumetric flow data.

Flowpath 54 extends through nozzle body 50 from flow meter 34' to orifice 52. Flow control valve 38' is mounted to nozzle body 50. Actuator 44a' is mounted to nozzle body 50. In the example shown, actuator 44a' is an electric stepper motor. The number of steps are counted by a position sensor, such as sensor 24 (FIG. 1) or position sensors 48a, 48b (FIG. 2), and can be communicated to one of nozzle controller 28 (FIGS. 1 and 2) and/or control module 20 (FIGS. 1 and 2). Valve position information for flow control valve 38' can be generated based on the step count. While actuator 44a' is described as an electric stepper motor, it is understood that actuator 44a' can be of any type suitable for discretely altering the position of valve member 42a'.

Valve member 42a' is disposed in flowpath 54. In the example shown, valve member 42a' is a needle configured to engage a seat. It is understood, however, that valve member 42a' can be of any configuration suitable for controlling flow through flowpath 54. Arm 46a' extends from actuator 44a' to valve member 42a'. In the example shown, arm 46a' is a shaft driven by actuator 44a' to adjust the position of valve member 42a'. It is understood, however, that arm 46a' can be of any type suitable for actuating valve member 42a'. Actuator 44a' can be configured to drive arm 46a' either linearly or rotatably.

The portion of flowpath 54 between flow control valve 38' and orifice valve 40' forms a pressure chamber immediately upstream of orifice valve 40'. Pressure sensor 36' is associated with that portion of the flowpath 54 and is configured to generate pressure data regarding the liquid pressure in that portion of the flowpath 54. Pressure sensor 36' can be of any configuration suitable for sensing the liquid pressure in flowpath 54 and for generating pressure data regarding that liquid pressure. In one example, pressure sensor 36' can be a diaphragm mounted on a printed circuit board disposed in nozzle body 50. The diaphragm can be exposed to the flowpath 54.

The liquid is ejected as a spray through orifice 52. Orifice valve 40' is configured to control the size of orifice 52 during spraying. As such, orifice 52 is a variable orifice. Orifice valve 40' is mounted to nozzle body 50. Actuator 44b' is mounted to nozzle body 50. In the example shown, actuator 44b' is an electric stepper motor. The number of steps are counted by a position sensor, such as sensor 24 or position sensors 48a, 48b, can be communicated to one of nozzle controller 28 and/or control module 20. Valve position information for orifice valve 40' can be generated based on the step count. While actuator 44b' is described as an electric stepper motor, it is understood that actuator 44b' can be of any type suitable for discretely altering the position of valve member 42b'.

Valve member 42b' defines orifice 52. In the example shown, valve member 42b' is an impingement member configured to turn the liquid and generate the liquid spray. The liquid pressure upstream of valve member 42b' and the size of orifice 52 control the droplet size of the liquid spray. As such, the position of valve member 42b' is adjusted based on the spray command the liquid pressure to generate a liquid spray having the desired droplet size. While valve member 42b' is described as an impingement member, it is understood that valve member 42b' can be of any configuration suitable for generating the spray. Arm 46b' extends from actuator 44b' to valve member 42b'. In the example shown, arm 46b' is a shaft driven by actuator 44b' to adjust the position of valve member 42b'. It is understood, however, that arm 46b' can be of any type suitable for actuating valve member 42b'. Actuator 44b' can be configured to drive arm 46b' either linearly or rotatably.

Figure 4:
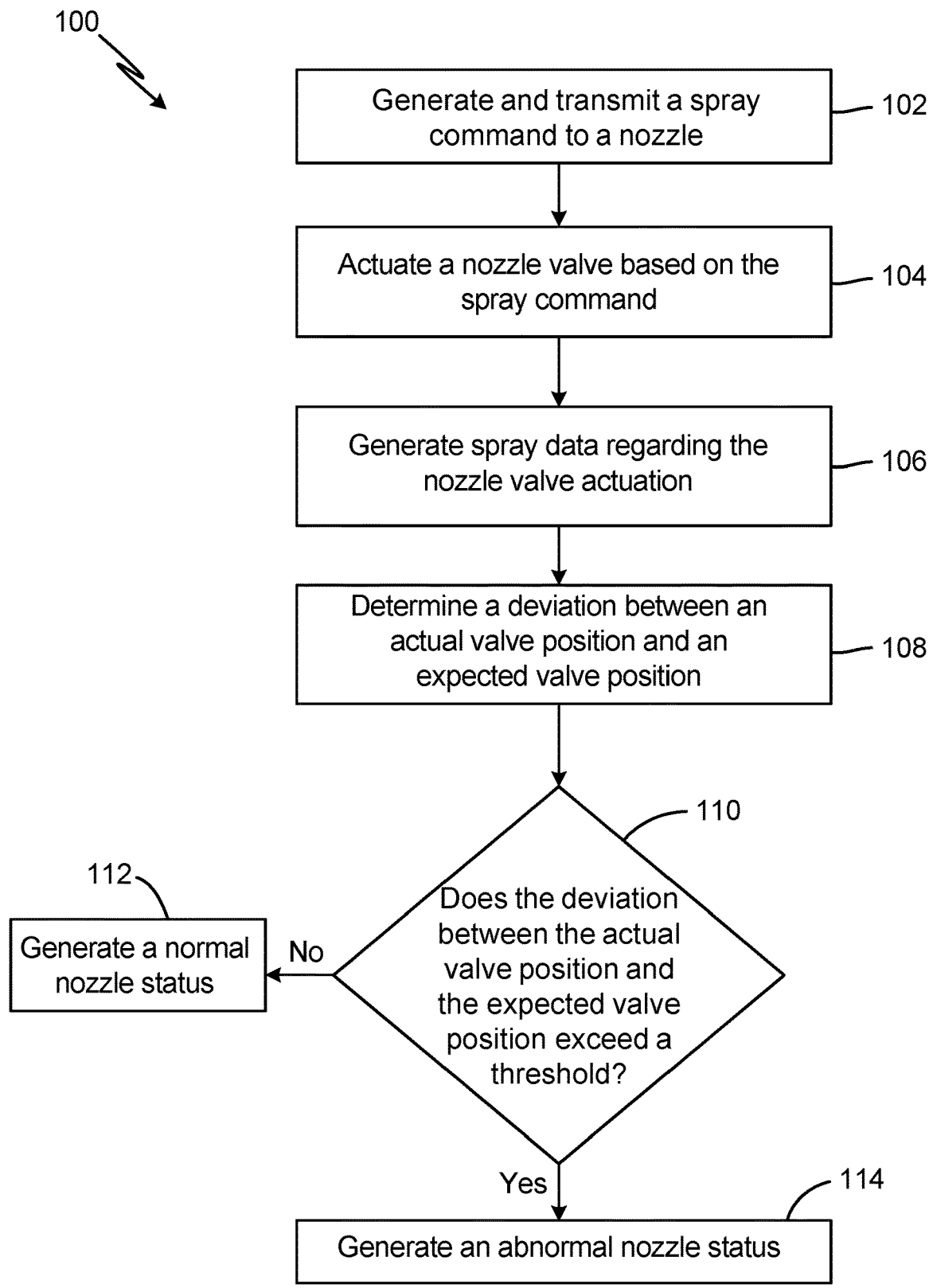
FIG. 4 is a flow chart illustrating a nozzle fault detection method.

FIG. 4 is a flowchart illustrating method 100 of nozzle fault detection. In step 102, a spray command is generated and sent to a first nozzle, such as nozzle 16 (FIG. 1), nozzle 16' (FIG. 2), and nozzle 16" (FIG. 3). The spray command can be generated by a control module, such as control module 20 (FIGS. 1 and 2). The spray command provides a desired application rate and droplet size to the nozzle. The spray command can be generated in any desired manner, such as automatically or manually. For example, the control module can automatically generate the spray command based on a prescription map stored in a memory of the control module, such as memory 32 (FIG. 1). In other examples, the user can manually set the application rate and droplet size, thereby setting the parameters of the spray command.

In step 104, one or more valves, such as valves 26 (FIG. 1), first valve 38 (FIG. 2), second valve 40 (FIG. 2), flow control valve 38' (FIG. 3) and orifice valve 40' (FIG. 3), are actuated to spray positions based on the spray command. In one example, multiple valves are actuated to set positions to cause nozzle 16 to eject liquid according to the commanded application rate and droplet size. Each of the valves can be individually controlled.

In step 106, spray data is generated and transmitted to control module 20. In some examples, the spray data includes valve position information for each of the one or more valves. In other examples, the spray data includes both valve position information and liquid parameter information, such as volumetric flow rate and pressure. In some examples, the nozzle can also report the actual droplet size, as calculated from flow rate and pressure, to the control module.

In step 108, the control module compares the actual valve position to an expected valve position to determine a deviation between the actual position that the valve was actuated to in response to the spray command and an expected position of the valve based on the spray command. For example, the control module can recall baseline data, such as from a memory of the control module, and can determine the expected valve position based on the baseline data. The baseline valve data can be any one or more of historical valve data, reference valve data, and modeled valve data, among other options. In some examples, the actual droplet size can be compared to an expected droplet size.

In step 110, the control module determines the nozzle status. The control module compares the actual valve position to the expected valve position to determine a deviation between the actual valve position and the expected valve position. The control module compares the deviation to a threshold to determine the nozzle status of that nozzle. If the difference between the actual valve position and the expected valve position is less than the threshold, then method 100 proceeds to step 112. In step 112, the control module generates a normal nozzle status. The normal status can be stored in the memory for later use, such as for tracking purposes. In some examples, the control module can be configured to take no further action based on the nozzle status being a normal nozzle status.

If the deviation between the actual valve position and the expected valve position meets and/or exceeds the threshold, then method 100 proceeds to step 114. In step 114, the control module generates an abnormal nozzle status. The abnormal nozzle status indicates that the actual valve position deviated from the baseline valve position by at least the threshold amount. Such a deviation indicates that the nozzle is operating outside the expected operational bounds. The control module can generate an abnormal status alert based on the abnormal nozzle status and can send the abnormal status alert to the user. In other examples, the control module can implement an auto-repair routine based on the abnormal nozzle status.

In some examples, the control module is configured to determine abnormal nozzle statuses having differing severity levels by comparing the deviation to multiple different thresholds. The severity level of the abnormal status alert can vary based on the magnitude of the difference between the actual valve position and the expected valve position. For example, the abnormal status alert can be a first severity level, indicating that preventative maintenance should be performed on the nozzle, based on the difference exceeding a lower threshold. The abnormal status alert can be of a second, higher severity level, indicating that maintenance is required such as due to a nozzle failure and/or blockage, based on the difference exceeding a higher threshold. It is understood, however, that the control module can be configured to generate as many or as few unique alerts as desired based on various thresholds. In some examples, the control module is configured to compare the difference to a single threshold and to generate the abnormal status alert based on that threshold.

The control module can record the existence of an abnormal nozzle status and data associated with the abnormal nozzle status in the memory of the control module. For example, the controller can record the time that the abnormal nozzle status was detected, the extent of time over which the nozzle remained in the abnormal nozzle status, the portions of the field that the nozzle traversed while having the abnormal nozzle status, and any actions taken in response to the abnormal nozzle status, among other options. The control module can, in some examples, generate a nozzle status report that provides information regarding the status of nozzle d operation.

The control module can further prompt the user to take action based on the abnormal nozzle status. The control module sends the abnormal status alert to the user and prompts the user to take an action based on the abnormal nozzle status. The prompted action can include seeking authorization to initiate an auto-repair routine, ignoring the current alert, silencing the alert until the end of the spray operation, and initiating some other action, among other options. The control module can store the user's response in the memory to provide accurate tracking of the spray operation.

Method 100 provides significant advantages. The control module automatically tracks the statuses of each individual nozzle within the spray system. The control module determines when individual nozzles are operating abnormally. The control module can alert the user to the abnormal nozzle status in real time, providing the user instant notice that a nozzle is operating abnormally. In addition, the control module can generate individual nozzle reports and/or overall system reports regarding the status of each nozzle during operation. The reports can be provided to the user and/or offloaded to a remote computing device. The reports can also provide the as-applied flow rate and droplet sizes from each nozzle, which allows the user to tailor future applications based on the as-applied information. Such tracking provides feedback to the user and/or the supplier regarding the actual application of the material by the sprayer. In addition, the control module can compare the difference between the actual and expected valve positions against various thresholds to generate alerts of differing urgencies. For example, an alert of a first severity level can inform the user that the nozzle is worn and components should be replaced soon. Such an alert allows the user to perform preventative maintenance before a failure actually occurs. An alert of a second severity level alert can inform the user that a nozzle has failed. Such an alert allows the user to take immediate action, minimizing the over-application and/or under-application of the material due to the failed nozzle.

Figure 5:
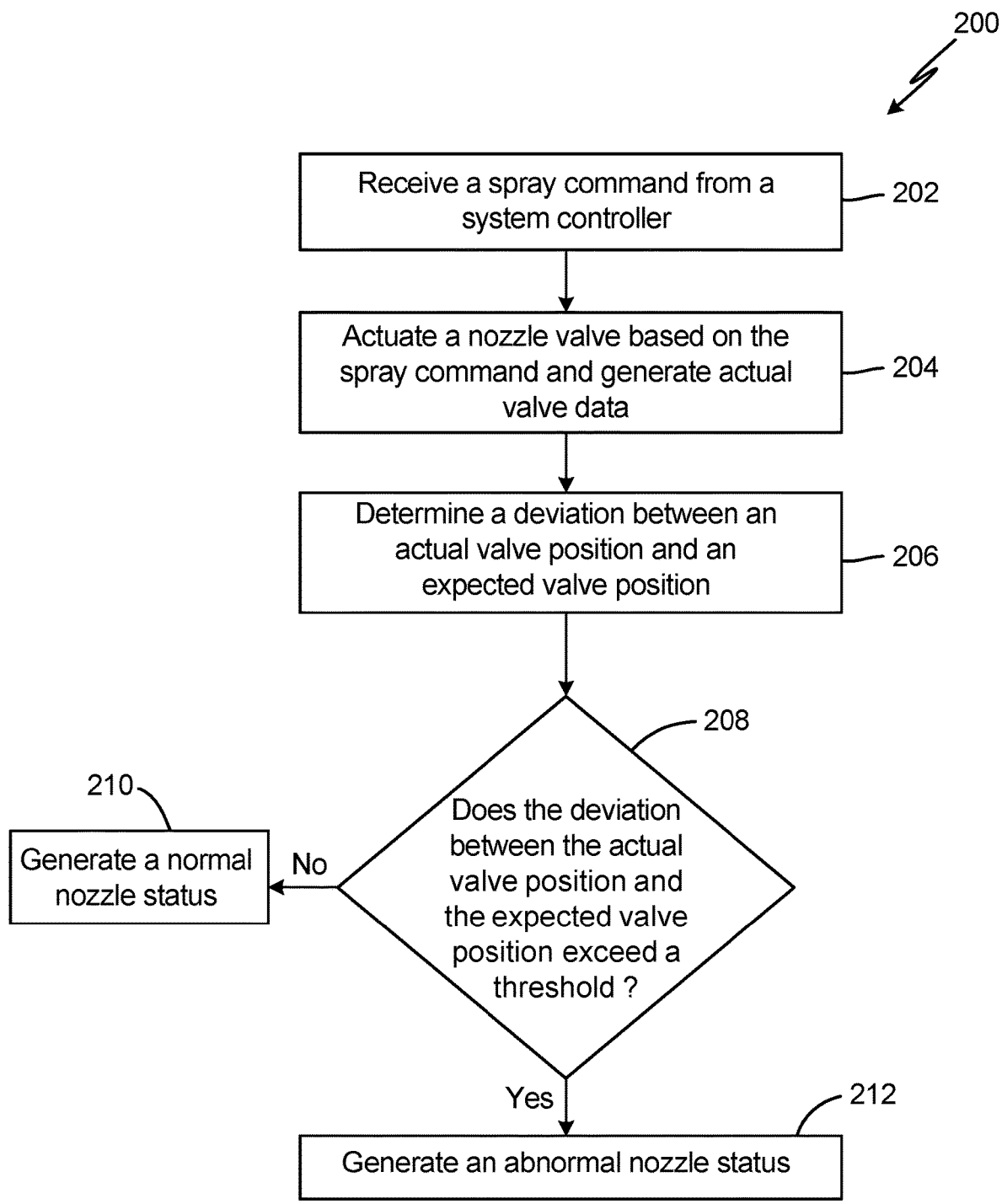
FIG. 5 is a flow chart illustrating a nozzle fault detection method.

FIG. 5 is a flowchart illustrating method 200 of nozzle fault detection. In step 202, a spray command is received at a nozzle controller, such as nozzle controller 28 (FIGS. 1 and 2) of a nozzle, such as nozzle 16 (FIG. 1), nozzle 16' (FIG. 2), and nozzle 16" (FIG. 3). In step 204, the nozzle controller actuates a first valve, such as valve 26 (FIG. 1), first valve 38 (FIG. 2), or flow control valve 38', and a second valve, such as valve 26 (FIG. 1), second valve 40 (FIG. 2), or orifice valve 40' (FIG. 3) to spray positions based on the spray command. For example, the spray command can instruct the nozzle to emit liquid according to an application rate and at a certain droplet size. Each of the first valve and the second valve are individually positioned to achieve a liquid spray corresponding to the spray command. The nozzle controller receives valve position information regarding each of the first valve and the second valve from position sensors of the nozzle, such as sensors 24 (FIG. 1) and position sensors 48a, 48b (FIG. 2). The nozzle actuates the first valve and the second valve such that the nozzle emits a liquid spray according to the parameters specified in the spray command.

In step 206, the nozzle controller compares the actual positions of the valves, determined from the valve position information, to expected positions of the valves, which can be determined from baseline data. The baseline data can be recalled by nozzle controller from a memory of nozzle controller. In some examples, the nozzle controller can be configured to generate unique historical position data regarding the positioning of the valves of that nozzle. The nozzle controller can generate the historical data during operation and can store that historical data for later comparison. In some examples, the historical position data can be an average of previous actual valve positions. The nozzle controller compares the actual valve position, from the valve position information, to the expected valve position, from the baseline data, to determine the nozzle status. While the baseline data is described as historical data from the nozzle, it is understood that the baseline data can be of any type suitable for making the comparison and that is accessible by the nozzle controller, such as reference valve data or modeled valve data.

In step 208, the nozzle controller determines the nozzle status. The nozzle controller compares the actual valve positions to the expected valve positions to determine deviations between the actual valve positions and the expected valve positions. The nozzle controller compares the deviation to a threshold to determine the nozzle status of that nozzle. If the difference between the actual valve position and the expected valve position is less than the threshold, then method 200 proceeds to step 210. In step 210, the nozzle controller generates a normal nozzle status based on the determination from step 208. The normal nozzle status can be stored in the memory of the nozzle controller and/or transmitted to the user and/or to another computing device. For example, the nozzle controller can communicate the normal nozzle status to a system controller, such as control module 20 (FIGS. 1 and 2). In some examples, the nozzle controller can augment the historical data with the actual valve position based on the nozzle controller determining a normal nozzle status. In some examples, the nozzle controller is configured to take no action based on the nozzle status being a normal nozzle status.

If the deviation between the actual valve position and the expected valve position meets and/or exceeds the threshold, then method 200 proceeds to step 212. In step 212 the nozzle controller determines that the nozzle status is an abnormal nozzle status based on the deviation between the actual valve position and the expected valve position. While the deviation is described as compared to a single threshold, it is understood that the deviation can be compared to multiple thresholds and nozzle controller can generate abnormal nozzle statuses of varying severity levels based on the multiple thresholds.

The nozzle controller can also generate an abnormal status alert based on the abnormal nozzle status. The nozzle controller can provide the abnormal status alert to one or both of the system controller and the user, such as via user interface 22 (FIG. 1). In some examples, the system controller can be configured to run another comparison to confirm the abnormal nozzle status sensed by the nozzle controller. In one example, the system controller can compare the actual valve position to an expected valve position derived from baseline data other than the baseline data utilized by the nozzle controller. For example, the system controller can compare the actual valve position to an expected valve position derived from reference valve data and/or modeled valve data. In some examples, the abnormal status alert can prompt the user and/or the system controller to take an action, such as initiating a repair protocol and/or repairing the nozzle.

Method 200 provides significant advantages. Each nozzle in the spray system can automatically tracks its own status and provide information regarding that status. The nozzle controller can determine if the nozzle is operating normally or abnormally. The nozzle controller can alert the system controller and/or the user to the abnormal nozzle status in real time, providing an instant notification that the nozzle is operating abnormally. The nozzle controller can compare the difference between the actual valve position and the expected valve position to various thresholds to generate alerts of differing severity levels. For example, one alert can inform that the nozzle is worn and components should be replaced soon. The system controller can log that information for system wide tracking and/or the user can initiate maintenance based on the alert. Such an alert allows the user to perform preventative maintenance before a failure actually occurs. Another alert can inform the system controller and/or user that the nozzle has failed. Such an alert allows the system controller and/or user to take immediate action, minimizing the over-application and/or under-application of liquid due to a failed nozzle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of detecting faults in spray nozzles, the method comprising:
   actuating a first valve of a spray nozzle based on a spray command regarding a commanded application rate and a commanded droplet size;
   generating, by a first position sensor, first position information regarding an actual position of the first valve;
   comparing, by a controller, the actual position of the first valve to an expected position of the first valve, wherein the expected position is determined from historical valve position information of the first valve;
   generating, by the controller, a nozzle status based on the comparison of the actual position of the first valve and the expected position of the first valve;
   averaging the historical valve position information to obtain an average valve position of the first valve based on previous actuations of the first valve; and
   storing the average valve position as the expected position of the first valve.

2. The method of claim 1, wherein comparing, by the controller, the actual position of the first valve to the expected position of the first valve comprises:
   determining a difference between the actual position of the first valve and the expected position of the first valve; and
   comparing the difference to a first threshold value.

3. The method of claim 2, wherein comparing, by the controller, the actual position of the first valve to the expected position of the first valve further comprises
   comparing the difference to a second threshold value, the second threshold value being larger than the first threshold value; and
   generating a first abnormal status alert based on the difference being between the first threshold value and the second threshold value; and
   generating a second abnormal status alert based on the difference being greater than the second threshold value.

4. The method of claim 2, wherein generating, by the controller, the nozzle status based on the comparison of the actual position and the expected position comprises:
   generating an abnormal nozzle status based on the difference being at least the first threshold value.

5. The method of claim 4, wherein generating, by the controller, the nozzle status based on the comparison of the actual position and the expected position further comprises:
   generating a normal nozzle status based on the difference being less than the first threshold value.

6. The method of claim 4, further comprising:
   generating an abnormal status alert based on the abnormal nozzle status; and
   providing the abnormal nozzle alert to a user via a user interface.

7. The method of claim 1, wherein the controller is a nozzle controller integrated into the nozzle.

8. The method of claim 7, wherein actuating the first valve based on the spray command comprises:
   receiving, by the nozzle controller, the spray command; and
   generating, by the nozzle controller, a first position command and transmitting the first position command to the first valve to cause actuation of the first valve.

9. The method of claim 8, further comprising:
   generating, by the nozzle controller, a second position command; and
   transmitting the second position command to a second valve of the nozzle to cause actuation of the second valve.

10. The method of claim 1, wherein the controller is a communicatively coupled to a plurality of nozzles, and wherein the controller is configured to generate the spray command.

11. The method of claim 10, wherein actuating the first valve based on the spray command comprises:
    generating, by the controller, a plurality of spray commands;
    transmitting a first spray command of the plurality of spray commands to a first nozzle of the plurality of nozzles; and
    generating, by a first nozzle controller of the first nozzle, a first position command; and
    transmitting the first position command to the first valve to cause actuation of the first valve.

12. The method of claim 11, further comprising:
    transmitting, by the first nozzle controller, the first position information to the controller.

13. The method of claim 11, further comprising:
    transmitting the first spray command to a second nozzle of the plurality of nozzles;
    generating, by a second nozzle controller of the second nozzle, second position information regarding an actual position of a first valve of the second nozzle; and
    comparing the actual position of the first valve of the second nozzle to the expected position of the first valve of the second nozzle.

14. The method of claim 10, wherein the plurality of nozzles are mounted on a boom extending from an agricultural sprayer.

15. A nozzle comprising:
- a first valve at least partially disposed within a first nozzle body and configured to control liquid flow through a first flow path in the first nozzle body;
- a first position sensor operatively coupled to the first valve, the first position sensor configured to generate first position information;
- a first liquid sensor disposed upstream of the first valve and configured to generate first liquid parameter information regarding a first liquid parameter of the liquid flowing through the first flow path; and
- a controller communicatively coupled to the first valve and configured to control actuation of the first valve based on a spray command regarding a commanded application rate and a commanded droplet size;
- wherein the controller is configured to compare an actual position of the first valve to an expected position of the first valve and to determine a nozzle status of the nozzle based on the comparison of an actual position and the expected position;
- wherein the actual position of the first valve is based on the first position information;
- wherein the expected position comprises an average position of the first valve based on previous actuations of the first valve; and
- wherein the controller is configured to store historical position information of the first valve and to average the historical valve position data to obtain the average valve position of the first valve.

16. The nozzle of claim 15, wherein the controller is a nozzle controller supported by the first nozzle body.

17. The nozzle of claim 15, wherein the first liquid sensor is a flow meter.

18. The nozzle of claim 15, further comprising:
- a second valve at least partially disposed within a first nozzle body and configured to control liquid flow through an outlet of the nozzle;
- a second position sensor operatively coupled to the second valve, the second position sensor configured to generate second position information; and
- a second liquid sensor disposed downstream of the first valve and upstream of the second valve and configured to generate second liquid parameter information regarding a second liquid parameter of the liquid flow.

19. The nozzle of claim 18, wherein the second liquid sensor comprises a pressure sensor.

* * * * *